July 7, 1925.
W. D PICKARD ET AL
1,545,449
PORTABLE STOVE
Filed Nov. 4, 1924
2 Sheets-Sheet 1
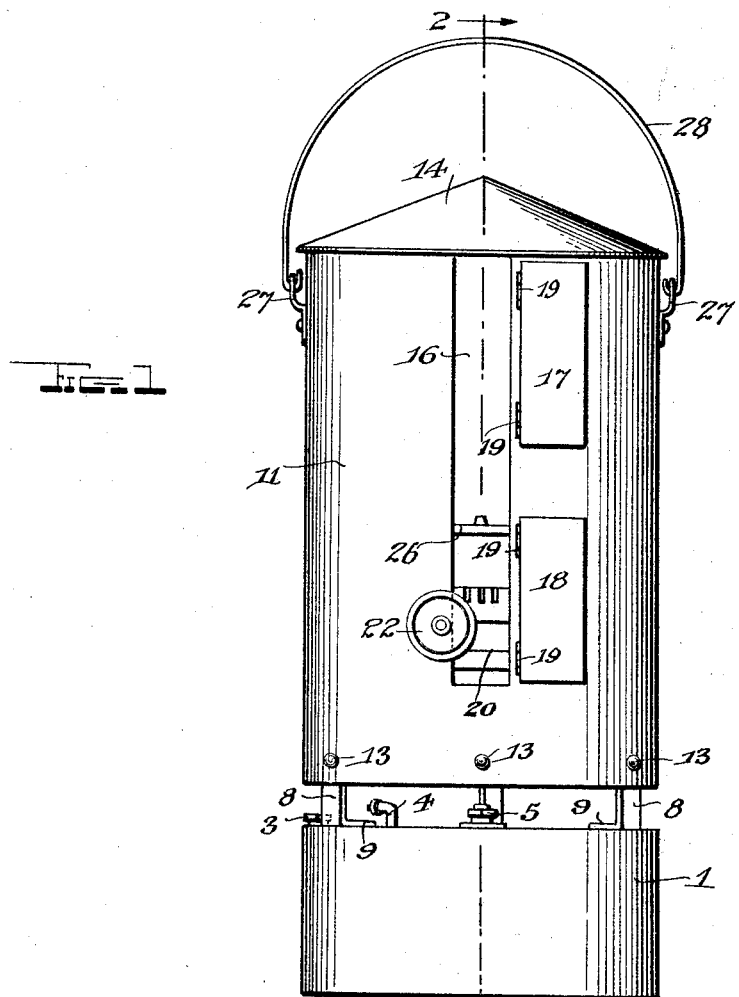
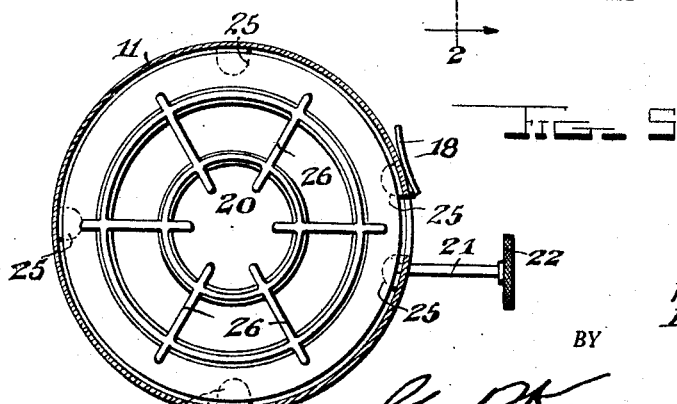
INVENTORS
W. D. Pickard
Lelia Pickard,
BY
Geo. F. Kimmel. ATTORNEY.

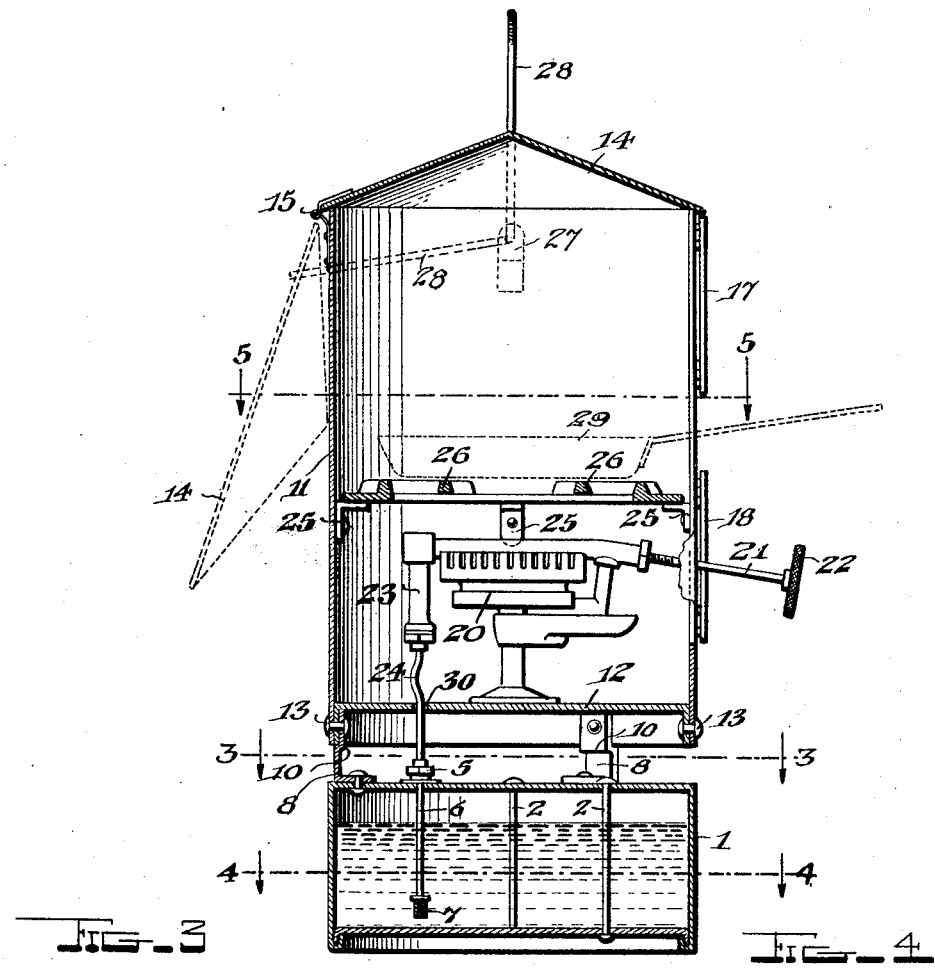
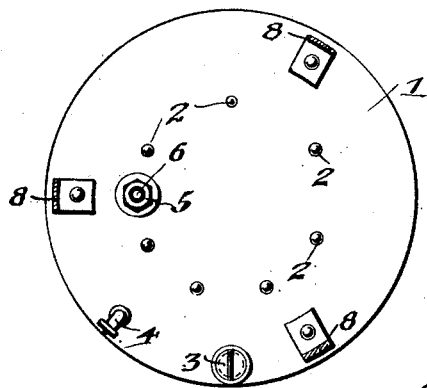
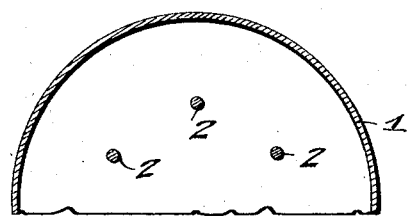

Patented July 7, 1925.

1,545,449

UNITED STATES PATENT OFFICE.

WINFORD D. PICKARD AND LELIA PICKARD, OF NORMAN, OKLAHOMA.

PORTABLE STOVE.

Application filed November 4, 1924. Serial No. 747,744.

*To all whom it may concern:*

Be it known that we, WINFORD D. PICKARD and LELIA PICKARD, citizens of the United States, residing at Norman, in the county of Cleveland and State of Oklahoma, have invented certain new and useful Improvements in Portable Stoves, of which the following is a specification.

This invention relates to portable stoves and pertains particularly to stoves adapted to use of campers.

The primary object of the invention is the provision, in a manner as hereinafter set forth, of a cooking stove so constructed that the burner thereof may be completely covered and shielded from wind, rain or dust.

Another object of the invention is the provision, in a manner as hereinafter set forth, of a camper's stove having the burner thereof completely shielded and further having means whereby a frying pan or other utensil having a handle may be placed therein, with the handle protruding therefrom for the convenient removal of the utensil.

The invention contemplates the provision of a liquid fuel stove having the fuel reservoir at the underside thereof and forming a base therefor, and having supported above the fuel reservoir a cylindrical casing having the top thereof hingedly secured thereto and having a vertical slot of substantial width formed in the side and extending from the upper edge to a point adjacent the bottom thereof, this slot having covering doors hingedly secured to the side of the casing. A fuel burner is mounted within the casing and a grate is removably mounted above the fuel burner, and the burner is supplied with fuel from the tank therebeneath, the said fuel being forced up into the burner by the pressure of air forced into the fuel tank.

A further and final object of the invention is the provision, in a manner as hereinafter set forth, of a camper's stove of compact unique construction, light in weight, attractive in appearance and inexpensive to manufacture.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:

Figure 1 is a front elevation of the stove embodying this invention.

Figure 2 is a longitudinal section taken upon the line 2—2 of Figure 1.

Figure 3 is a section taken upon the line 3—3 of Figure 2.

Figure 4 is a section taken upon the line 4—4 of Figure 2, and

Figure 5 is a section taken upon the line 5—5 of Figure 2.

Referring now to the drawings in detail, wherein like numerals of reference indicate corresponding parts throughout the several views, there is indicated by the numeral 1, a fuel tank or drum having a series of brace or supporting rods extending therethrough from the top to the bottom thereof as indicated at 2. The top of this drum 1 is provided with a fuel filling aperture closed by a plug 3, a valve nozzle 4 having an inwardly opening valve, and through which air is adapted to be forced into the tank to retain the contents thereof under pressure, and at 5 there is indicated a securing nut of an outlet tube 6, which tube extends into the tank as shown in Figure 2 and carries at its lower end a strainer element 7.

Secured to the top of the fuel tank 1 is a series of angular supporting members 8, one leg 9 of each member being securely fastened to the top of the tank, and the other end extending vertically therefrom and having its upper portion inset as at 10 to receive and support the upper portion of the stove as will be described.

Supported above the fuel tank 1 by means of the supports 8, which supports, as shown in Figure 3, are positioned adjacent the outer edge of the top of the tank, is a casing 11 having the bottom 12 therein, the edge of which bottom is downturned and riveted to the inner face of the casing as at 13, and this downturned portion of the bottom 12, as well as the lower edge of the casing 11 extends over the upper end of the supports 8, as shown in Figure 2, and bears against the offset portion 10 of the support. It will be noted that certain of the rivets 13 pass through the upper end of the supports 8 and thereby secure the casing 11 to the top of the drum 1. The top of the drum 1 is covered by the conical cover 14 which is hingedly secured as at 15 to the side of the casing and adapted to swing over from the top thereof to open the upper end, as indicated in dotted lines in Figure 2. The casing 11 has a relatively wide aperture cut in and longitudinally of the same as at 16, this aperture extends to the top of the casing, and terminates at a point above the lower edge of the casing, as shown in Figure 1.

Secured to the outer face of the casing 11, adjacent one side of the aperture 16, is a pair of doors 17 and 18, respectively which are hingedly secured to the casing, as at 19, and these doors are further spaced apart, so that when swung to closed position the upper and lower portion of the opening 16 will be covered leaving the central portion thereof uncovered. The purpose for this will become apparent as the description proceeds.

Positioned centrally upon the floor 12, within the casing, is a liquid fuel burner, indicated generally by the numeral 20, having the controlling valve stem 21 which extends through the side of the casing, and terminates at its outer end outside of the casing in the hand wheel 22. The valve needle which the stem 21 controls, controls the fuel inlet pipe 23 which is a part of the burner 20, and this fuel inlet pipe is connected by means of the tubing 24, which extends through the aperture 30 in the floor 12, to the fuel outlet tube 6 in the drum 1, by means of the nut 5 which acts to hold these two tubes in connection one with the other. The fuel burner as shown at 20, is of the type generally employed for burning gasoline, but applicants do not confine themselves to this type of burner, for it is to be understood that other types of burners may be used in this structure, if desired.

Secured to the inner wall of the casing 11 above the burner 20 is a series of right angled brackets 25 upon which there is supported over the burner 20, a grate 26 which is removable, as shown.

The casing 11 may have secured thereto adjacent the top thereof ears 27 for the engagement therewith of a bale 28 by means of which the stove can be moved about.

In the operation of this stove, if it is desired to use a frying pan, such as that indicated at 29, upon the grate 26, the doors 17 and 18 are opened, and the lid 14 is lifted, and the pan lowered into the casing 11, the handle passing down through the slot 16. When the stove has been lighted, the cover 14 and the doors 17 and 18 may be closed to protect the flame from wind or to prevent rain or dust from entering the casing, and the handle of the pan 28 will extend from the casing between the doors 17 and 18, as shown in Figure 2 of the drawings.

The fuel in the tank 1 is caused to flow upward through the tubes 6 and 24 into the burner, by means of compressed air which is forced into the tank through the nozzle 4, and in order to protect the tank against rupture, through the pressure exerted by the air contained therein, the brace rods 2 are provided.

From the foregoing description it will be seen that there has been constructed a neat and very serviceable camper's stove which is well adapted for use in any kind of weather, as the stove is well protected against wind and rain and is further well protected against dust which may be in the air. It is to be noted that in the event that a receptacle of some height is used, for instance, a coffee or tea pot, the upper door 17 may be left open to allow the handle thereof to project through the slot 16, as the handle of such a receptacle would be positioned higher than the handle of a pan of the type shown in the drawings.

Having thus described our invention what we claim is:

1. A stove of the character set forth, comprising an upright cylindrical body, open at its top and having a longitudinally extending opening through one side and merging with said top, a pair of doors hingedly secured at one edge to said body at one side of said opening, to cover portions of the same, said doors being in spaced relation, a fuel reservoir, bracket elements supporting said body upon said reservoir, and a burner element within said body, having communication with said reservoir.

2. A stove of the character set forth, comprising a fuel reservoir, a series of supporting brackets about the top edge thereof, a relatively long upright cylindrical body mounted upon said brackets, said body being open at its top and having a longitudinally extending opening through one side from the top to a point adjacent the bottom thereof, a closure for said top, a pair of elongated spaced closures for said side opening, hingedly secured along their edges to said body, and a fuel burner within said body having communication with said reservoir.

In testimony whereof, we affix our signatures hereto.

WINFORD D. PICKARD.
LELIA PICKARD.